United States Patent
Floarea

(10) Patent No.: US 10,012,253 B2
(45) Date of Patent: Jul. 3, 2018

(54) SELF-ADJUSTING BRACKET ASSEMBLY AND INSTALLATION METHOD

(71) Applicant: Dan M Floarea, Oshawa (CA)

(72) Inventor: Dan M Floarea, Oshawa (CA)

(73) Assignee: FCA US LLC, Auburn Hills, MI (US)

( * ) Notice: Subject to any disclaimer, the term of this patent is extended or adjusted under 35 U.S.C. 154(b) by 497 days.

(21) Appl. No.: 14/695,402

(22) Filed: Apr. 24, 2015

(65) Prior Publication Data

US 2016/0312811 A1    Oct. 27, 2016

(51) Int. Cl.
| | |
|---|---|
| *A47G 29/00* | (2006.01) |
| *F16B 5/06* | (2006.01) |
| *B60R 19/18* | (2006.01) |

(52) U.S. Cl.
CPC .......... *F16B 5/0607* (2013.01); *F16B 5/0628* (2013.01); *B60R 2019/1886* (2013.01); *F16B 2005/0678* (2013.01)

(58) Field of Classification Search
CPC ...... B60R 21/213; F16B 5/0642; F16B 21/02; E05B 79/12
See application file for complete search history.

(56) References Cited

U.S. PATENT DOCUMENTS

| | | | |
|---|---|---|---|
| 5,098,765 A | 3/1992 | Bien | |
| 5,358,302 A | 10/1994 | Schoen et al. | |
| 5,636,891 A | 6/1997 | Van Order et al. | |
| 5,765,959 A * | 6/1998 | Shioda | E05B 79/12 403/192 |
| 6,092,953 A | 7/2000 | Chaptal et al. | |
| 6,283,540 B1 | 9/2001 | Siebelink, Jr. et al. | |
| 7,207,758 B2 * | 4/2007 | Leon | F16B 21/02 411/45 |
| 7,374,200 B2 * | 5/2008 | Ikeda | B60R 21/213 280/728.2 |
| 8,636,454 B2 * | 1/2014 | Okada | F16B 5/0642 24/295 |

FOREIGN PATENT DOCUMENTS

WO    2008/002222 A1    1/2008

* cited by examiner

*Primary Examiner* — Amy J. Sterling
(74) *Attorney, Agent, or Firm* — Ralph E Smith

(57) ABSTRACT

A self-adjusting bracket assembly includes a bracket, a clip housing, and a clip. The clip housing is supported by the bracket and includes an anterior side opening, a superior side opening, and a cavity in communication with the anterior and superior side openings. The cavity includes at least one housing ramp surface and at least one housing support surface. The at least one housing ramp surface extends at an angle relative to the at least one housing support surface. The clip is received within the cavity and is configured to move within the cavity from an uninstalled position to an installed position.

17 Claims, 8 Drawing Sheets

SELF-ADJUSTING BRACKET ASSEMBLY AND INSTALLATION METHOD

FIELD

The present disclosure relates to a self-adjusting bracket assembly and related methods of use and installation. More particularly, the present disclosure relates to a self-adjusting bracket assembly for mounting a fascia panel relative to a vehicle body panel.

BACKGROUND

This section provides background information related to the present invention and is not necessarily prior art.

Clips, brackets, and other mechanical fasteners are used to construct panel assemblies. Specifically, a primary panel is often assembled to, or relative to, a secondary panel using clip(s), bracket(s), and/or other mechanical fastener(s), such that edge portions of the primary and secondary panels define a seam between the primary and secondary panels. In a motor vehicle, a fascia panel of the motor vehicle can be assembled to, or relative to, a body panel of the motor vehicle using screws, bolts, pins, and/or clips such that edge portions of the fascia panel and the body panel define a seam in an exterior body portion of the motor vehicle. Often, assembling the fascia panel to, or relative to, the body panel requires that a user apply a large amount of force to one and/or both of the panels. Moreover, it can be difficult to ensure that the fascia panel is relative to the body panel in a desired position such that the size of the seam is uniform, or otherwise optimized, along the length of the edge portions.

While known fasteners for assembling panel assemblies have generally proven to be acceptable for their intended purpose, a continuous need for improvement in the relevant art remains. In this regard, it would be desirable to provide a fastener that allows a user to assemble one panel relative to another panel quickly, easily, and in a way that ensures that the one panel is located in a desired position relative to the other panel.

SUMMARY

This section provides a general summary of the present invention, and is not a comprehensive disclosure of its full scope or all of its features.

The present disclosure provides a self-adjusting bracket assembly. The self-adjusting bracket assembly includes a bracket, a clip housing, and a clip. The clip housing is supported by the bracket and includes an anterior side opening, a superior side opening, and a cavity in communication with the anterior and superior side openings. The cavity includes at least one housing ramp surface and at least one housing support surface. The at least one housing ramp surface extends at an angle relative to the at least one housing support surface. The clip is received within the cavity and is configured to move within the cavity from an uninstalled position to an installed position.

In some configurations, the clip configured to move within the cavity includes the clip configured to pivot within the cavity from the at least one housing ramp surface to the at least one housing support surface.

In some configurations, the clip configured to move in the cavity includes the clip configured to pivot and slide within the cavity from the uninstalled position to the fully installed position.

In some configurations, the clip includes at least one clip ramp surface and at least one clip support surface. The at least one clip ramp surface extends at an angle relative to the at least one clip support surface.

In some configurations, the cavity includes lateral portions, an intermediate portion disposed between the lateral portions, and a central portion disposed between the lateral portions.

In some configurations, the central portion is recessed relative to the intermediate portion, and the intermediate portion is recessed relative to the lateral portions.

In some configurations, the at least one housing ramp surface includes a central ramp surface and a lateral ramp surface, and the at least one housing support surface includes a central support surface and a lateral support surface. In some configurations, the central ramp and support surfaces are recessed relative to the lateral ramp and support surfaces.

In some configurations, the central ramp surface is parallel to the lateral ramp surface.

In some configurations, the bracket includes an aperture and the clip includes a lock feature disposed within the aperture in the installed position.

The present disclosure also provides a self-adjusting panel assembly including a support panel, a secondary panel, and a self-adjusting bracket assembly. The support panel includes a support panel edge. The secondary panel includes a secondary panel edge. The self-adjusting bracket assembly includes a clip housing and a clip. The clip housing is fixed relative to the support panel and includes an anterior side opening, a superior side opening, and a cavity in communication with the anterior and superior side openings. The cavity includes at least one housing ramp surface and at least one housing support surface inclined relative to the at least one housing ramp surface. The clip includes a catch feature engaged with the secondary panel. The clip is received within the cavity and is configured to move within the cavity from an uninstalled position to an installed position. The clip is configured to engage the housing ramp surface in the uninstalled position, and configured to engage the housing support surface in the installed position.

In some configurations, the clip configured to move within the cavity includes the clip configured to pivot and slide within the cavity from the uninstalled position to the fully installed position.

In some configurations, vertical and horizontal distances that separate the support panel edge and the secondary panel edge in the fully installed position are less than vertical and horizontal distances that separate the support panel edge and the secondary panel edge in the uninstalled position.

In some configurations, the clip includes at least one clip ramp surface and at least one clip support surface, the at least one clip ramp surface inclined relative to the at least one clip support surface.

In some configurations, the clip support surface engages the housing support surface, and the clip ramp surface engages the housing ramp surface.

In some configurations, the self-adjusting panel assembly includes a bracket supported by the support panel, the bracket having an aperture, wherein the clip includes a lock feature disposed within the aperture in the installed position.

In some configurations, the bracket includes an aperture and the clip includes a lock feature disposed within the aperture in the installed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description is merely exemplary in nature and is in no way intended to limit the invention, its application, or uses.

Figure 1:
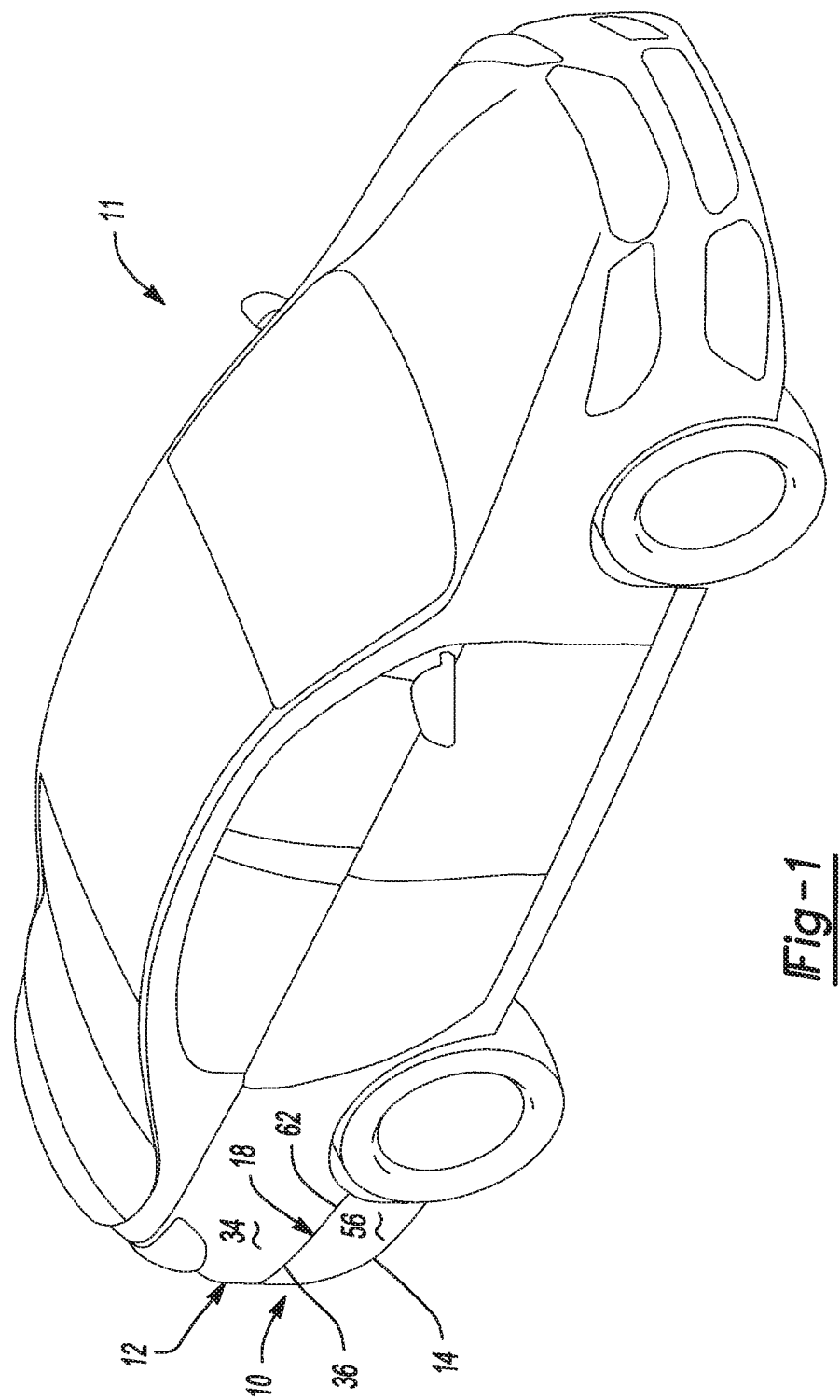
FIG. 1 is a perspective view of a vehicle having a panel assembly in accordance with the principles of the present disclosure.
Figure 2:
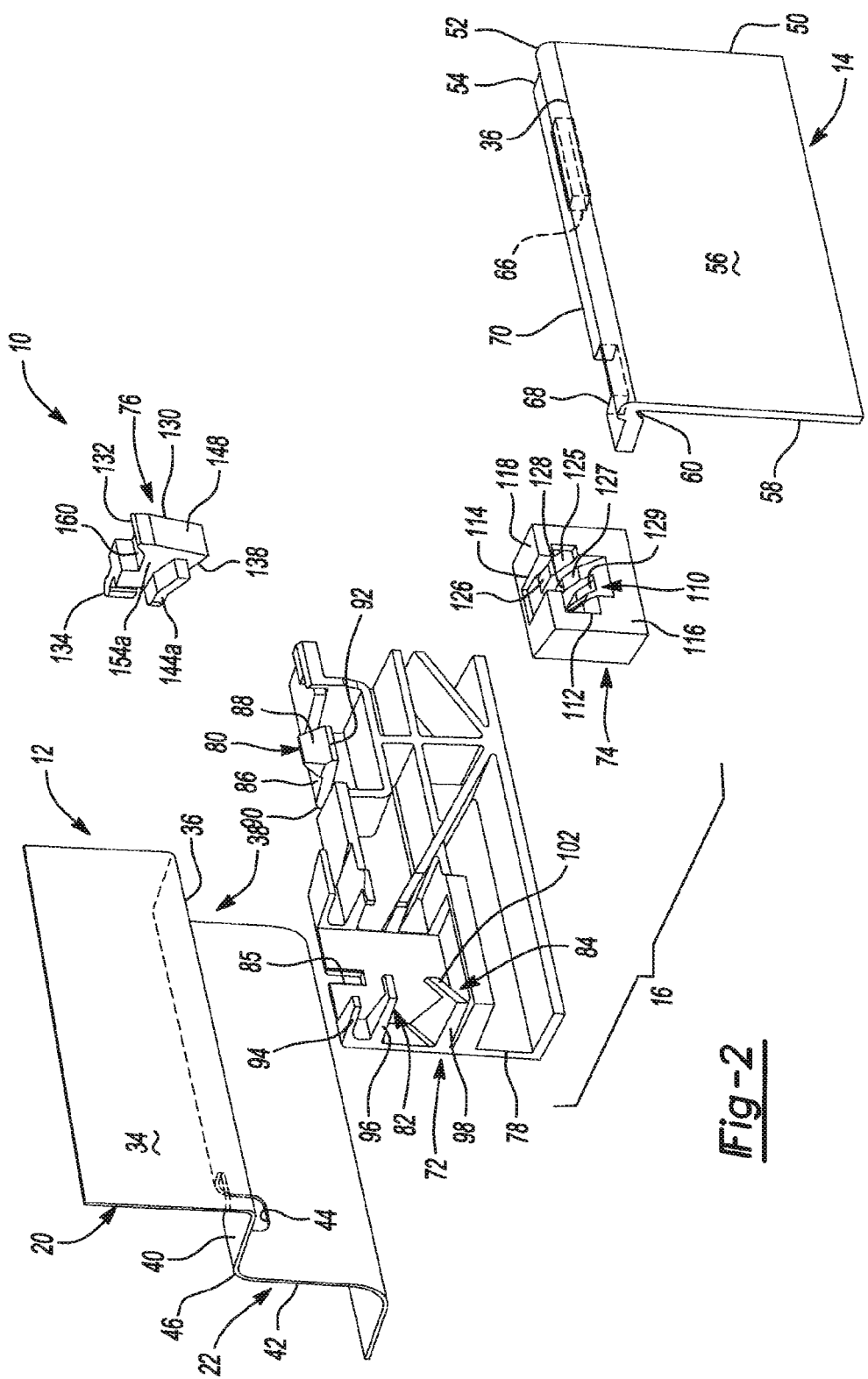
FIG. 2 is a front exploded view of the panel assembly of FIG. 1, including a self-adjusting bracket assembly in accordance with the principles of the present disclosure.

With reference to FIG. 1, a panel assembly 10 constructed in accordance with the principles of the present disclosure is illustrated. As illustrated, in some configurations, the panel assembly 10 is part of a vehicle 11, such as an automobile or truck. The panel assembly 10 includes a support panel 12, a secondary panel 14, and a self-adjusting bracket assembly 16 (FIG. 2). The support panel 12 and the secondary panel 14 define a seam 18 therebetween. It will be appreciated that the panel assembly 10 may form part of a larger assembly. For example, as indicated above, in some configurations the panel assembly 10 is part of the vehicle 11. In this regard, in some configurations the support panel 12 is a vehicle body panel, and the secondary panel 14 is a vehicle fascia panel. Accordingly, references herein to a vehicle body panel 12 and fascia panel 14 will be understood to refer equally to the support panel 12 and secondary panel 14, respectively. However, it will be appreciated that the scope of the present teachings is not limited to vehicle body panels and/or a vehicle fascia panels, and that the scope of the present teachings may be applied to various types of panel assemblies. By way of non-limiting example, the panel assembly 10 may include various panels and/or trim pieces throughout the vehicle 11. The panel assembly 10 may also include, or otherwise refer to, other panel assemblies (e.g., furniture panels) that are not related to the vehicle 11.

Figure 3:
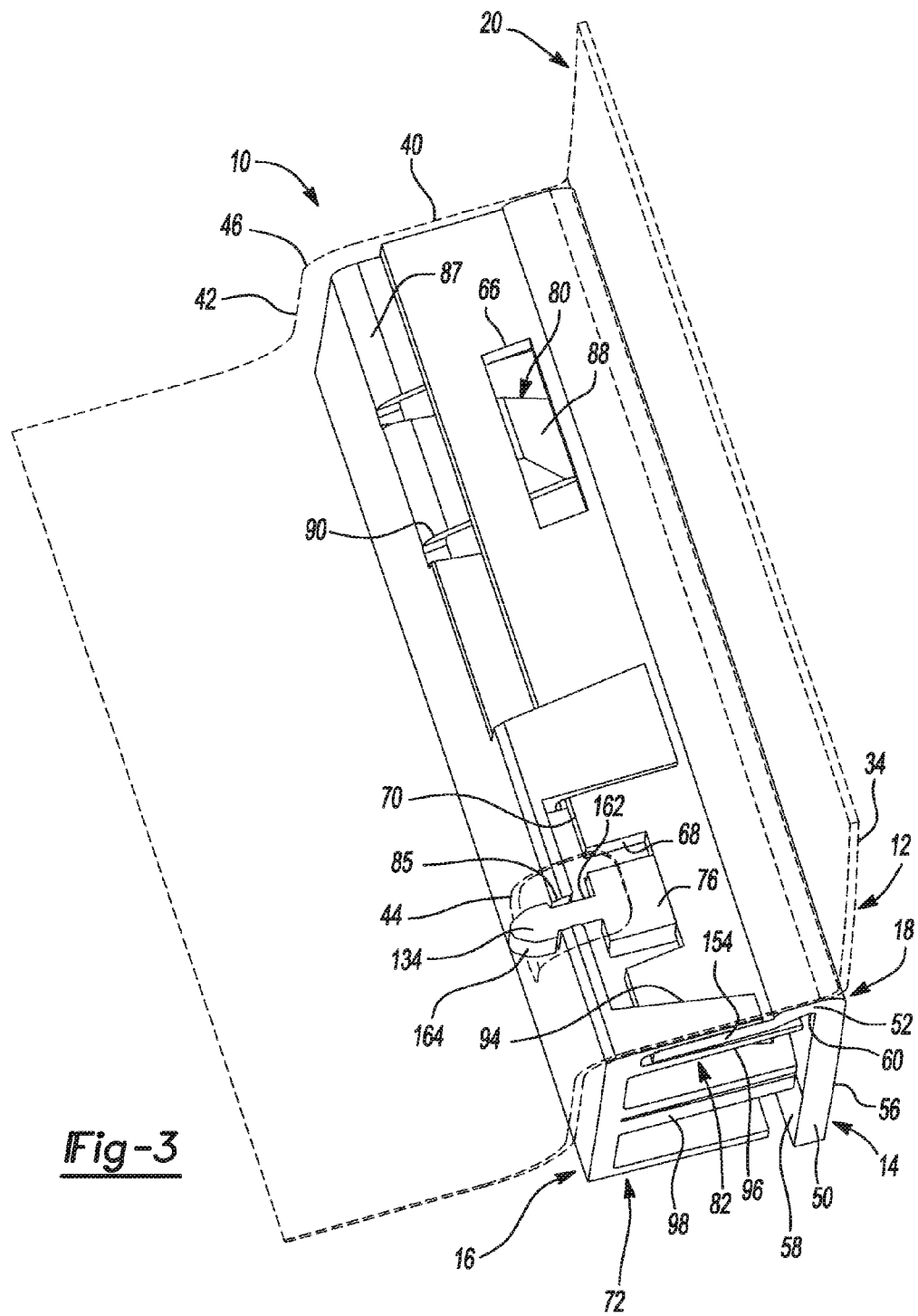
FIG. 3 is rear perspective view of the panel assembly of FIG. 1, a body panel shown in dashed line format for clarity.

As illustrated in at least FIGS. 2 and 3, in some configurations the support panel 12 includes a body portion 20 and a mounting portion 22. The body portion 20 includes a body surface 34. The mounting portion 22 has a horizontal (as oriented FIGS. 2 and 3) wall 40 that extends transversely away from a body panel edge 36 of body portion 20. As illustrated, in some configurations, the body panel edge 36 extends in linearly. It will be appreciated, however, that the body panel edge 36 may extend in other manners (e.g., arcuate, curvilinear, etc.) within the scope of the present disclosure. In some configurations the mounting portion 22 is an L-shaped construct extending from the body portion 20, such that the mounting portion 22 generally defines a recess 38 relative to the body surface 34. In this regard, the mounting portion 22 includes a distal wall 42 transverse to horizontal wall 40 and an aperture 44 with horizontal wall 40 extending from distal wall 42 to body portion 20. In some configurations, the aperture 44 is located in the distal wall 42 of the mounting portion 22. In other configurations the aperture 44 is located at or along an intersection 46 of the horizontal and distal walls 40, 42.

With continued reference to at least FIGS. 2 and 3, the secondary panel 14 includes body portion 50, an intermediate portion 52 supported by and extending from the body portion 50, and a mounting portion 54 supported by and extending from the intermediate portion 52. The body portion 50 of the secondary panel 14 includes an anterior surface 56 and a posterior surface 58 opposite the anterior surface 56. The intermediate portion 52 extends transversely away from the body portion 50, such that the body portion 50 and the intermediate portion 52 define a clip retention feature shown as a channel 60. The anterior surface 56 of the secondary panel 14 includes a secondary panel edge 62. As illustrated, in some configurations, the secondary panel edge 62 extends linearly. It will be appreciated, however, that the secondary panel edge 62 may extend in other manners or directions (e.g., arcuate, curvilinear, etc.) within the scope of the present disclosure. In this regard, in the assembled configuration, the body panel edge 36 extends parallel to the secondary panel edge 62.

The mounting portion 54 of the secondary panel 14 extends transverse to the intermediate portion 52 and generally away from the body portion 50. Accordingly, the intermediate portion 52 is located between the body and mounting portions 50, 54. In this regard, in some configurations the body portion 50 is disposed substantially perpendicular to the mounting portion 54. The mounting portion 54 includes a mounting feature which in an aspect is an aperture 66 and a clip alignment feature which in an aspect is a notch 68. The notch 68 is formed in a posteriorly facing peripheral edge 70 of the mounting portion 54.

The bracket assembly 16 includes a bracket 72, a clip housing 74, and a clip 76. As will be explained in more detail below, in an assembled configuration, the bracket assembly 16 secures the support panel 12 relative to the secondary panel 14. The bracket 72 includes a support wall 78, a secondary panel retention feature 80, a secondary panel alignment feature 82, and a clip housing retention feature 84. The support wall 78 includes a clip retention feature shown as an aperture 85 formed in an edge 87 of the support wall 78. In an aspect, aperture 85 is a slot. The secondary panel retention feature 80 extends from the edge 87 of the support wall 78 and includes an arm 86 and a tang 88. The arm 86 includes a proximal end 90 coupled to the edge 87 of the support wall 78, and a distal end 92 offset from the support wall 78. In this regard, it will be appreciated that in an aspect the arm 86 resiliently flexes relative to the support wall 78. The tang 88 extends transversely from the arm 86 proximate to the distal end 92.

Figure 6:
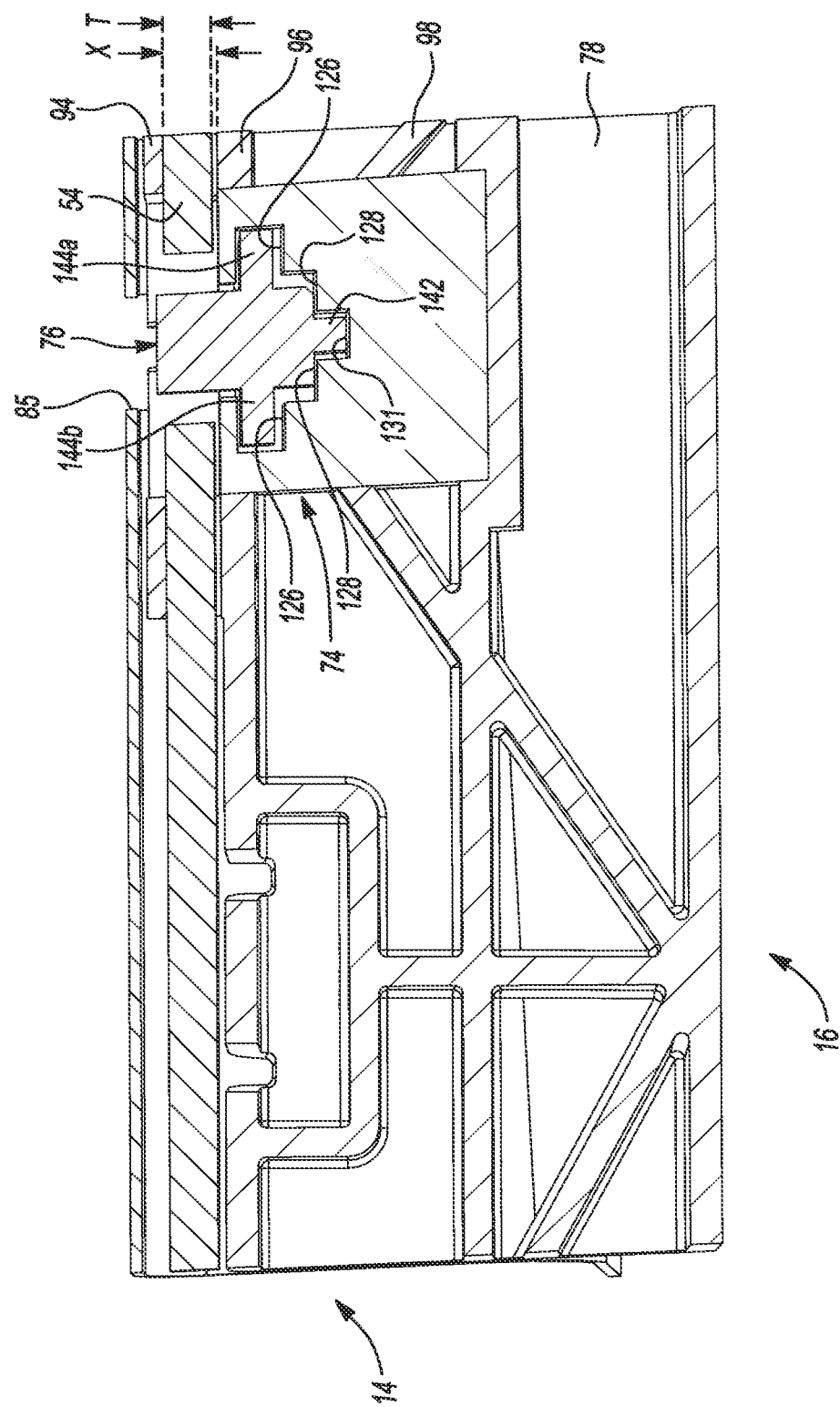
FIG. 6 is a cross-sectional view of the clip and clip housing in an assembled configuration.

With reference to FIGS. 2, 3 and 6, the secondary panel alignment feature 82 includes opposed arms 94, 96 extending from the support wall 78. As illustrated in FIG. 6, the opposed arms 94, 96 are separated by a distance X that is greater than or substantially equal to a thickness T of the secondary panel 14. As will be explained in more detail below, in the assembled configuration, the mounting portion 54 of the secondary panel 14 is disposed between the opposed arms 94, 96. In some configurations, at least one of the opposed arms 94, 96 engages the secondary panel 14 to help to secure the position of the secondary panel 14 relative to the support panel 12.

The clip housing retention feature 84 includes one or more retention arms 98 extending from the support wall 78. The retention arms 98 include a finger portion 102 extending from and transverse to the retention arm 98. As will be explained in more detail below, the clip housing retention feature 84 positions and secures the clip housing 74 relative to the bracket 72.

With reference to FIG. 2, the clip housing 74 includes a cavity 110. The cavity 110 is in communication with an anterior opening 112 and a superior opening 114 in the clip housing 74. The anterior opening 112 is formed in an anterior side 116 of the clip housing 74, and the superior opening 114 is formed in a superior side 118 of the clip housing 74.

Figure 5:
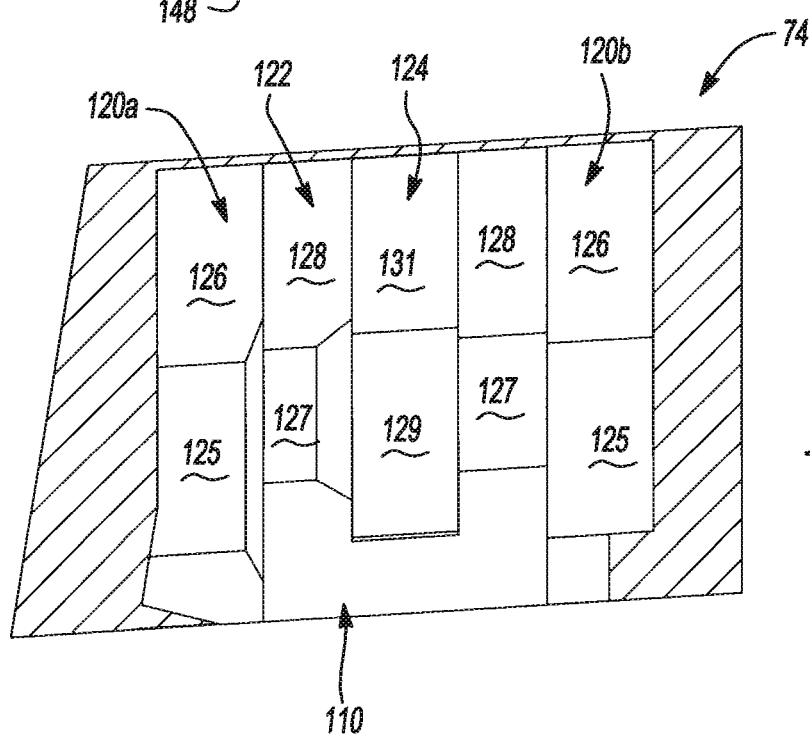
FIG. 5 is a cross-sectional view of a clip housing of the self-adjusting bracket assembly of FIG. 2.
Figure 7A:
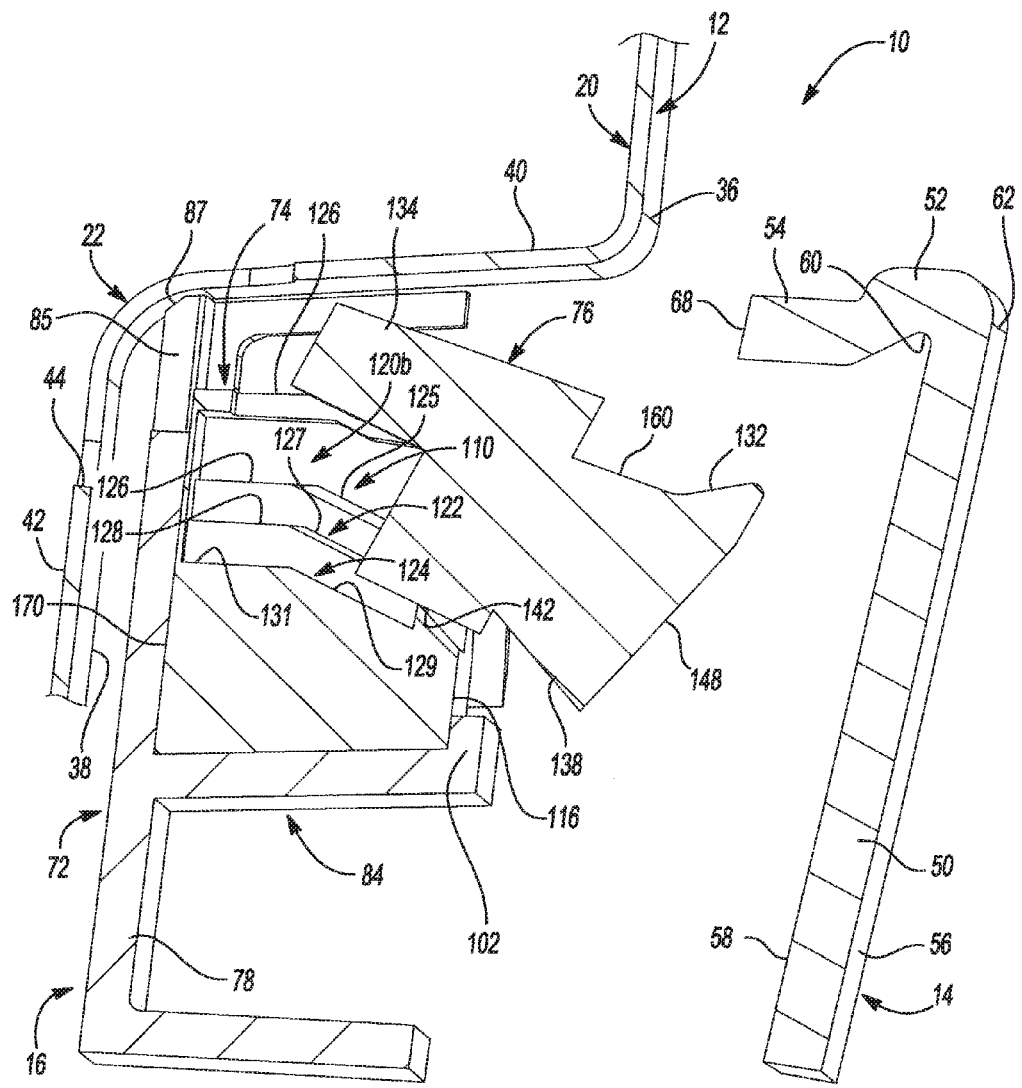
FIG. 7A is a cross-sectional view of the panel assembly of FIG. 1, showing the self-adjusting bracket assembly in an uninstalled position.

With reference to FIG. 5, the cavity is defined in part by side portions 120a, 120b, an intermediate portion 122, and a central portion 124. As illustrated in FIG. 7A, the intermediate portion 122 is recessed relative to the lateral portions 120a, 120b, and the central portion 124 is recessed relative to the intermediate portion 122 such that the cavity 110 has a stepped configuration. In some configurations, the intermediate portion 122 is centrally located relative to the lateral portions 120a, 120b, and the central portion 124 is centrally located relative to the intermediate portion 122 such that the cavity 110 includes a symmetrical construct relative to the central portion 124.

With continued reference to at least FIG. 5, the lateral portions 120a, 120b of the cavity each include a ramp surface 125 and a support surface 126. The ramp surface 125 extends from the anterior side 120 of the clip housing 74 and is inclined relative to the support wall 78 and/or relative to the support surface 126. The intermediate portion 122 of the cavity 110 includes a pair of ramp surfaces 127 and a pair of support surfaces 128. The ramp surfaces 127 are inclined relative to the support wall 78 and/or relative to the support surfaces 128. The central portion 124 of the cavity 110 includes a ramp surface 129 and a support surface 131. The ramp surface 129 extends from the anterior side 120 of the clip housing 74 and is inclined relative to the support wall 78 and/or relative to the support surface 131.

The ramp surfaces 125, 127, 129 and the support surfaces 126, 128, 131 each have a planar shape. In some configurations, the ramp surfaces 125, 127, 129 are substantially parallel to one another, and the support surfaces 126, 128, 131 are substantially parallel to one another. In this regard, the ramp surfaces 126, 128, 131 are inclined toward the superior side 118 of the clip housing 74 from the anterior side 116 of the clip housing 74.

Figure 4:
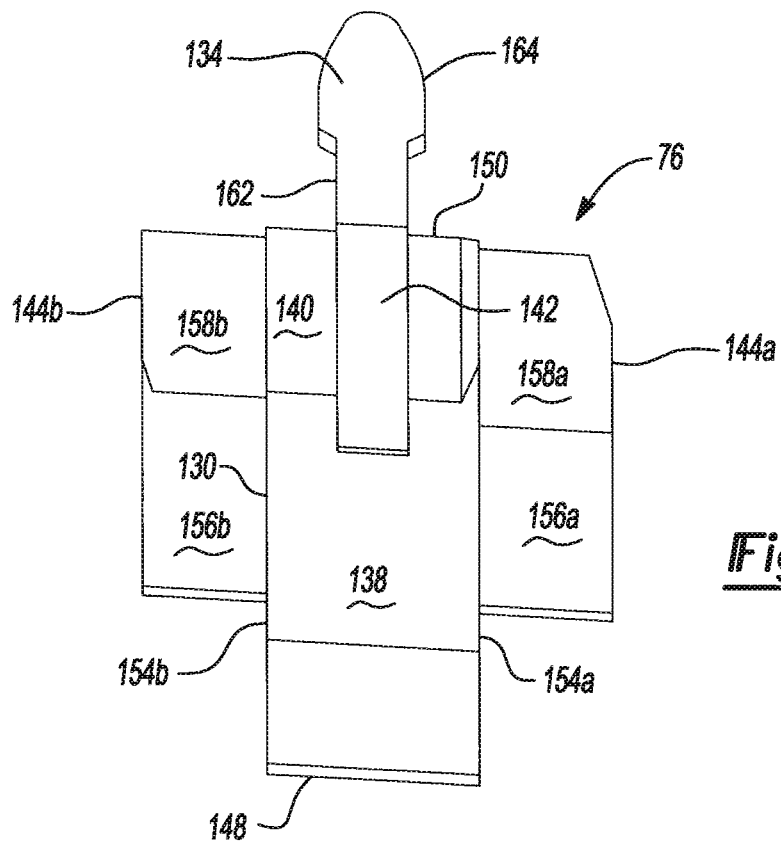
FIG. 4 is a bottom view of a clip of the self-adjusting bracket assembly of FIG. 2.

With reference to at least FIGS. 2 and 4, the clip 76 includes a body 130, a catch feature 132, and a lock feature 134. As illustrated in FIG. 4, the body 130 includes a central ramp surface 138 and a central support surface 140. The central ramp surface 138 extends from an anterior side 148 of the clip 76, and the central support surface 140 extends from a posterior side 150 of the clip 76. The central ramp surface 138 is inclined relative to the central support surface 140. A central flange 142 extends downwardly away from the central support surface 140. Lateral flanges 144a, 144b extend from opposed lateral sides 154a, 154b, respectively, of the body 130, and include ramp surfaces 156a, 156b, respectively, and support surfaces 158a, 158b, respectively. In some configurations, the ramp surfaces 138, 156a, 156b are parallel to one another, and the support surfaces 140, 158a, 158b are parallel to one another.

The catch feature 132 is disposed at the anterior side 148 of the clip 76 and extends upwardly from a superior side 160 of the clip 76. In this regard, as illustrated the catch feature 132 forms a hook-like projection at the anterior side 148 of the clip 76, such as a tooth.

The lock feature 134 is disposed at, and extends away from, the posterior side 150 of the clip 76. In this regard, the lock feature 134 includes a stem portion 162 and a head portion 164. The stem portion 162 is supported by, and extends away from, the clip 76 such that the head portion 164 is offset from the posterior side 150 of the clip 76.

Figure 7B:
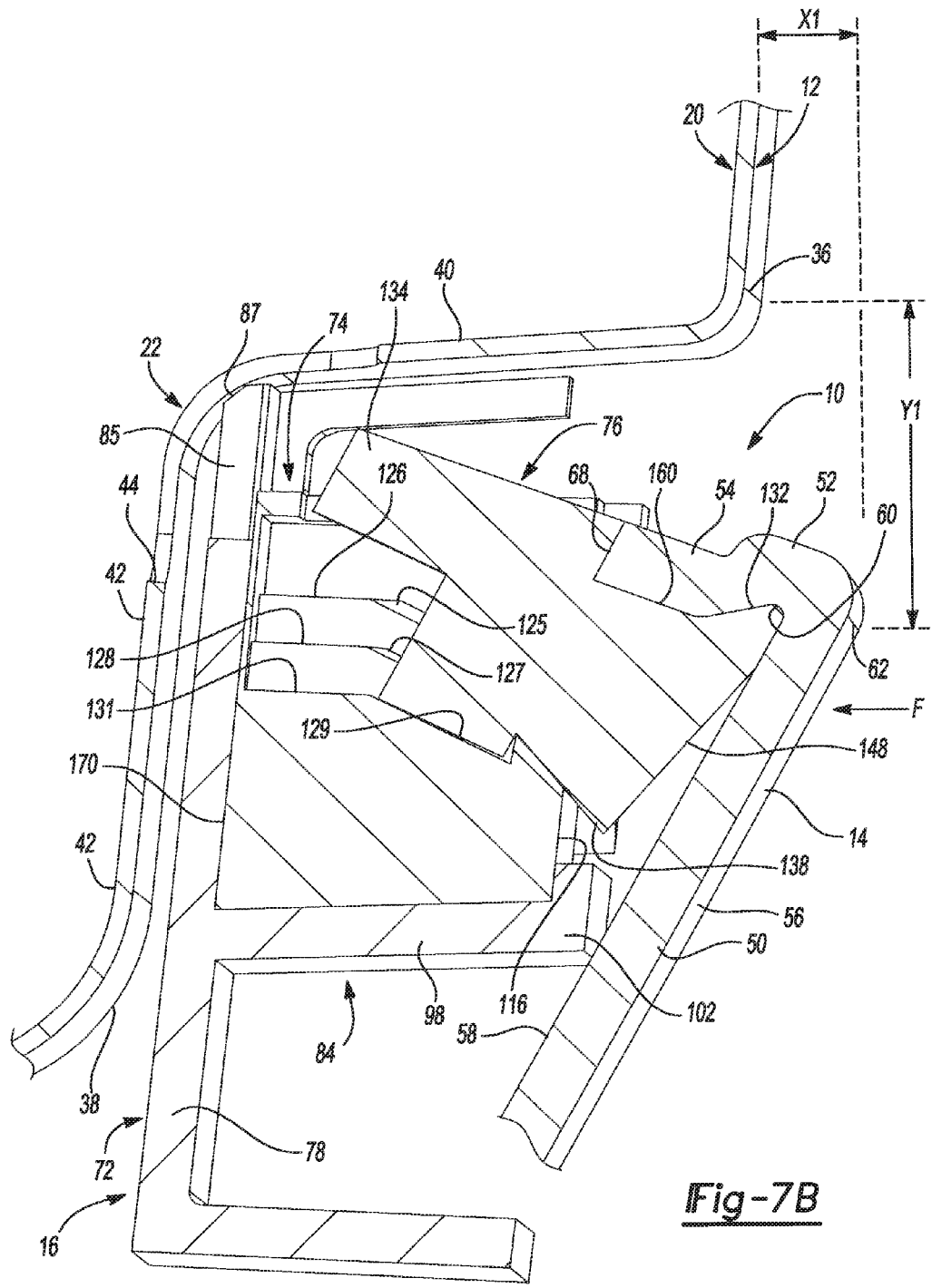
FIG. 7B is a cross-sectional view of the panel assembly of FIG. 1, showing the self-adjusting bracket assembly in an intermediate installation position.
Figure 7C:
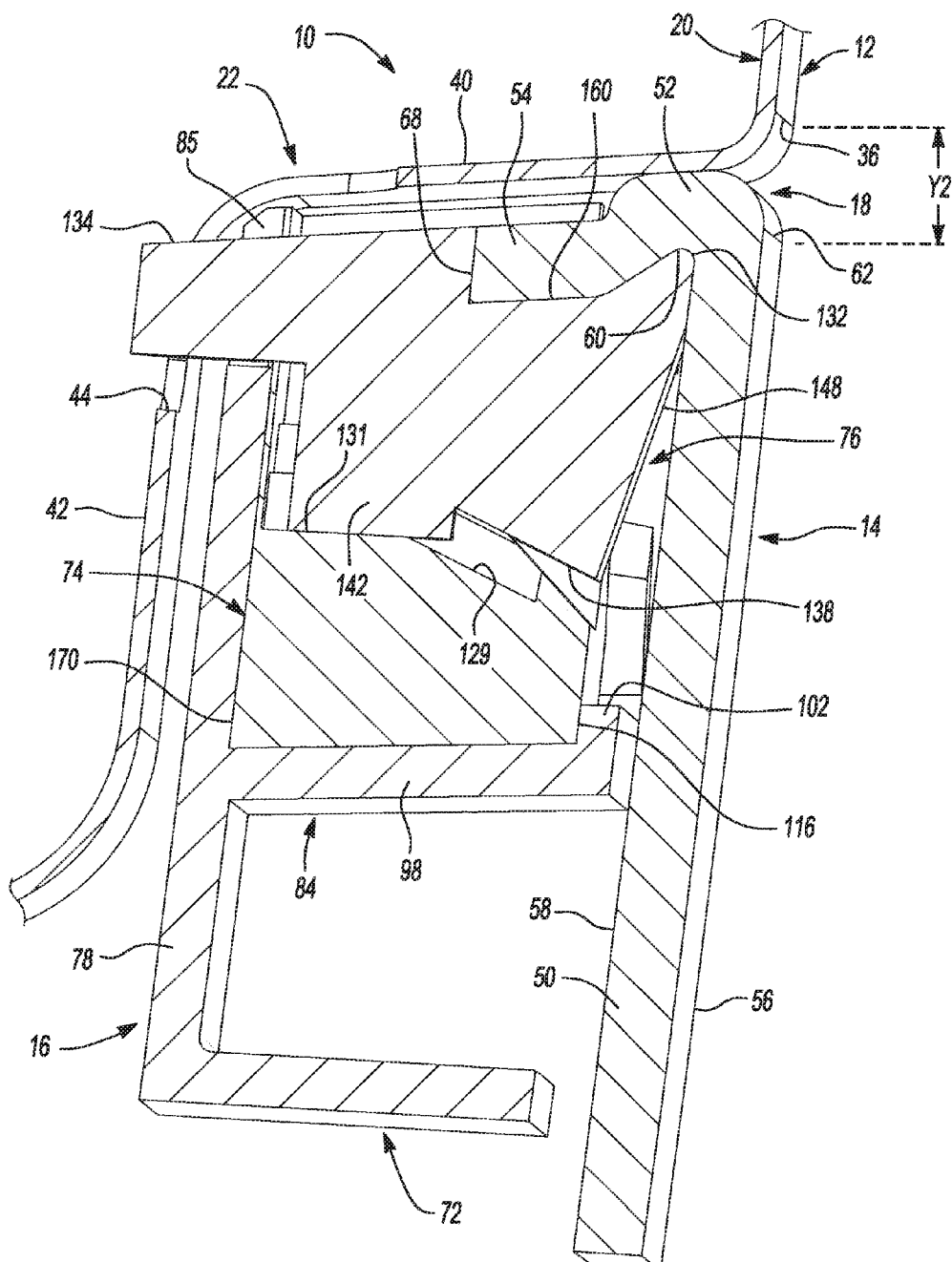
FIG. 7C is a cross-sectional view of the panel assembly of FIG. 1, showing the self-adjusting bracket assembly in a fully installed position.

With reference to FIGS. 7A-7C, a method of assembling the panel assembly 10 will be described in more detail. As illustrated in FIG. 7A, the clip housing 74 is secured to the bracket 72, and the bracket 72 is secured to the support panel 12. Specifically, the bracket 72 is secured within the recess 38 of the support panel 12 using a suitable fastening technique, such as adhesive, mechanical fasteners, or welding, for example. The clip housing 74 is secured between at least two of the retention arms 98 of the clip housing retention feature 84 such that the support wall 78 is adjacent a posterior side 170 of the clip housing 74, and the finger portion 102 engages the anterior side 116 of the clip housing 74. In this regard, the clip housing 74 is in a fixed position relative to the support panel 12. It will also be appreciated that while the bracket 72 and the clip housing 74 are generally shown and described herein as being separate components, in some configurations the bracket 72 and clip housing 74 are monolithically formed as a unitary construct.

With continued reference to FIG. 7A, the method of assembly includes partially inserting the clip 76 within the cavity 110, and positioning the secondary panel 14 on the clip 76 such that the catch feature 132 engages the channel 60. Specifically, the lateral flanges 144a, 144b are disposed within the lateral portions 120a, 120b of the cavity 110, the body 130 is disposed within the intermediate portion 122 of the cavity 110, and the central flange 142 is disposed within the central portion 124 of the cavity 110.

With reference to FIG. 7B, the method of assembly includes applying a force F on the secondary panel 14 and/or the clip 76 such that the clip 76 moves within the cavity 110 of the clip housing 74. In some configurations, as the clip 76 moves within the cavity 110, the clip pivots or rotates about the lateral flanges 144a, 144b. In some configurations, as the clip 76 moves within the cavity 110 of the clip housing 74, the ramp surfaces 138, 156a, 156b and/or the support surfaces 140, 158a, 158b of the clip 76 slide along the ramp surfaces 125, 127, 129 of the cavity 110. In an uninstalled position (FIG. 7B), the secondary panel edge 62 and the body panel edge 36 define a vertically extending distance Y1 and a horizontally extending distance X1 therebetween. It should be understood that in the uninstalled position, clip 76 has been partially inserted into clip housing 74 as discussed above.

With reference to FIGS. 7B and 7C, as the clip 76 moves (e.g., pivots and/or slides) within the cavity 110, the clip 76 moves from the uninstalled position illustrated in FIG. 7B to a fully installed position illustrated in FIG. 7C. In this regard, as the clip 76 moves within the cavity 110, the clip 76 will pivot from the uninstalled position (FIG. 7B) to the installed position (FIG. 7C). As the clip 76 pivots, one or more of the ramp surfaces 138, 156*a*, 156*b* and/or the support surfaces 140, 158*a*, 158*b* of the clip 76 will disengage from one or more of the ramp surfaces 125, 127, 129 of the cavity 110, and will thereafter engage one or more of the support surfaces 126, 128, 131 of the cavity 110. The catch feature 132 of the clip 76 also causes the secondary panel 14 to move in a vertical and horizontal direction relative to the view in FIG. 7B as the clip 76 pivots. Specifically, as the clip 76 pivots, the anterior surface 56 of the secondary panel 14 rotates in a counterclockwise direction relative to the view in FIG. 7B. Accordingly, once the clip 76 has pivoted, the secondary panel edge 62 and the body panel edge 36 define a vertically extending distance Y2 (FIG. 7C) therebetween that is less than the vertically extending distance Y1 (FIG. 7B).

Once the clip 76 has pivoted within the clip housing 74 such that the support surfaces 140, 158*a*, 158*b* of the clip 76 are engaging one or more of the support surfaces 126, 128, 131 of the cavity 110, the method of assembly also includes translating the clip 76 into the cavity 110 in a horizontal direction relative to the view in FIG. 7C until the clip 76 assumes the fully installed position (FIG. 7C). As the clip 76 translates in the cavity 110, the support surfaces 140, 158*a*, 158*b* of the clip 76 slide on the support surfaces 126, 128, 131 of the cavity 110. The catch feature 132 causes the secondary panel 14 to move in the horizontal direction relative to the view in FIG. 7C, and the bracket assembly 16, including the clip 76 and the clip housing 74, will cause the secondary panel 14 to approach the support panel 12 such that the secondary panel edge 62 is aligned with the body panel edge 36. Specifically, in the fully installed position, the secondary panel edge 62 and the body panel edge 36 define a vertically extending distance Y2 therebetween that is less than the vertically extending distance Y1. In an aspect, the secondary panel edge 62 is also aligned with the body panel edge 36 in the horizontal direction such that the horizontally extending distance X1 is essentially equal to zero. In this way, the bracket assembly 16 ensures that the seam 18 between the secondary panel edge 62 and the body panel edge 36 is uniform in the vertical and/or horizontal directions.

In the fully installed position (FIG. 7C), the lock feature 134 extends through the aperture 85 in the bracket 72 to secure the clip 76, and thus the secondary panel 14, relative to the bracket 72. In addition, the secondary panel retention feature 80 engages the secondary panel 14 such that the tang 88 secures the secondary panel to the bracket 16 via the aperture 66. The mounting portion 54 of the secondary panel 14 is positioned between the first and second arms 94, 96 of the secondary panel alignment feature 82. In this regard, the first and second arms 94, 96 help to prevent the secondary panel 14 from moving in the vertical direction relative to the support panel 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A self-adjusting bracket assembly comprises:
    a bracket;
    a clip housing supported by the bracket, the clip housing including an anterior side opening, a superior side opening, and a cavity in communication with the anterior and superior side openings, the cavity includes lateral portions, an intermediate portion disposed between the lateral portions, and a central portion disposed between the lateral portions, the central portion is recessed relative to the intermediate portion, and the intermediate portion is recessed relative to the lateral portions; and
    a clip received within the cavity through the anterior side opening and configured to move within the cavity from an uninstalled position to an installed position, the clip and cavity configured so that a superior side of the clip moves in vertical and horizontal direction as the clip moves from the uninstalled position to the installed position.

2. The self-adjusting bracket assembly of claim 1, wherein the clip configured to move within the cavity includes the clip configured to pivot within the cavity.

3. The self-adjusting bracket assembly of claim 1, wherein the clip configured to move in the cavity includes the clip configured to pivot and slide within the cavity from the uninstalled position to the fully installed position.

4. The self-adjusting bracket assembly of claim 1, wherein the cavity includes at least one housing ramp surface and at least one housing support surface, the at least one housing ramp surface extending at an angle relative to the at least one housing support surface.

5. The self-adjusting bracket assembly of claim 4, wherein the at least one housing ramp surface includes a central ramp surface and a lateral ramp surface, and the at least one housing support surface includes a central support surface and a lateral support surface, the central ramp and support surfaces recessed relative to the lateral ramp and support surfaces.

6. The self-adjusting bracket assembly of claim 5, wherein the central ramp surface is parallel to the lateral ramp surface.

7. The self-adjusting bracket assembly of claim 1, wherein the bracket includes an aperture and the clip includes a lock feature disposed within the aperture in the installed position.

8. A self-adjusting panel assembly comprising:
    a support panel having a support panel edge;
    a secondary panel having a secondary panel edge; and
    a self-adjusting bracket assembly including a clip housing and a clip, the clip housing fixed relative to the support panel and having an anterior side opening, a superior side opening, and a cavity in communication with the anterior and superior side openings, the cavity having at least one housing ramp surface and at least one housing support surface inclined relative to the at least one housing ramp surface, the clip having a catch feature engaged with the secondary panel, the clip received within the cavity and configured to move within the cavity from an uninstalled position to an installed position wherein the clip is configured to engage the at least one housing ramp surface in the uninstalled position, and configured to engage the at least one housing support surface in the installed position, wherein the clip configured to move within the cavity includes the clip configured to pivot within the cavity.

9. The self-adjusting panel assembly of claim 8, wherein the clip configured to move within the cavity includes the clip configured to pivot and slide within the cavity from the uninstalled position to the fully installed position.

10. The self-adjusting panel assembly of claim 8, wherein vertical and horizontal distances that separate the support panel edge and the secondary panel edge in the fully installed position are less than vertical and horizontal distances that separate the support panel edge and the secondary panel edge in the uninstalled position.

11. The self-adjusting panel assembly of claim 8, wherein the clip includes at least one clip ramp surface and at least one clip support surface, the at least one clip ramp surface inclined relative to the at least one clip support surface.

12. The self-adjusting panel assembly of claim 11, wherein the clip support surface engages the housing support surface, and the clip ramp surface engages the housing ramp surface.

13. The self-adjusting panel assembly of claim 8, wherein the cavity includes lateral portions, an intermediate portion recessed relative to the lateral portions, and a central portion recessed relative to the lateral portions.

14. The self-adjusting panel assembly of claim 8, further comprising a bracket supported by the support panel, the bracket having an aperture.

15. The self-adjusting panel assembly of claim 14, wherein the clip includes a lock feature disposed within the aperture in the installed position.

16. The self-adjusting panel assembly of claim 8, wherein the at least one housing ramp surface includes a central ramp surface and a lateral ramp surface, and the at least one housing support surface includes a central support surface and a lateral support surface, the central ramp and supports surfaces recessed relative to the lateral ramp and support surfaces.

17. The self-adjusting panel assembly of claim 16, wherein the central ramp surface is parallel to the lateral ramp surface.

* * * * *